(12) United States Patent
Zhou et al.

(10) Patent No.: US 10,823,457 B2
(45) Date of Patent: Nov. 3, 2020

(54) INTERNAL PRESSURE RELIEF SAFETY VALVE OF WATER HEATER AND WATER HEATER

(71) Applicant: Zhejiang Dunyun Industrial Co., Ltd., Zhuji (CN)

(72) Inventors: Weidong Zhou, Zhuji (CN); Tianlu Zhou, Zhuji (CN); Ye Feng, Zhuji (CN)

(73) Assignee: ZHEJIANG DUNYUN INDUSTRIAL CO., LTD., Zhuji (CN)

( * ) Notice: Subject to any disclaimer, the term of this patent is extended or adjusted under 35 U.S.C. 154(b) by 109 days.

(21) Appl. No.: 16/106,002

(22) Filed: Aug. 21, 2018

(65) Prior Publication Data

US 2019/0086120 A1     Mar. 21, 2019

(30) Foreign Application Priority Data

Sep. 21, 2017    (CN) ..................... 2017 2 1218625 U

(51) Int. Cl.
     *F24H 9/20*        (2006.01)
     *F16K 17/04*      (2006.01)

(52) U.S. Cl.
     CPC ......... *F24H 9/2007* (2013.01); *F16K 17/048* (2013.01); *F16K 17/0473* (2013.01)

(58) Field of Classification Search
     CPC ... F24H 9/2007; F16K 17/0473; F16K 17/048
     See application file for complete search history.

(56) References Cited

U.S. PATENT DOCUMENTS

| | | | | |
|---|---|---|---|---|
| 2,704,035 A | * | 3/1955 | Bader | F02D 19/105 |
| | | | | 417/504 |
| 2,882,922 A | * | 4/1959 | Schindel | F16K 17/105 |
| | | | | 137/491 |
| 4,265,267 A | * | 5/1981 | Cyphelly | F04C 14/26 |
| | | | | 137/115.05 |
| 4,681,559 A | * | 7/1987 | Hooven | A61M 27/006 |
| | | | | 137/504 |
| 5,162,624 A | * | 11/1992 | Duksa | H01H 35/405 |
| | | | | 137/512.1 |

(Continued)

FOREIGN PATENT DOCUMENTS

CN           206377312 U      8/2017

*Primary Examiner* — Jessica Cahill
*Assistant Examiner* — Patrick C Williams
(74) *Attorney, Agent, or Firm* — Bayramoglu Law Offices LLC

(57) ABSTRACT

An internal pressure relief safety valve of a water heater includes: a valve body including a water inflow channel, a water outflow channel and a pressure relief channel, the water inflow channel communicates with the water outflow channel through a water outflow hole; a unidirectional water inflow assembly disposed in the valve body and used for allowing water flow to flow from the water inflow channel to the water outflow channel unidirectionally; a valve clack cooperating with a side wall of the pressure relief channel in a sliding and sealing way; a flexible sealing gasket installed at one end of the valve clack facing toward the pressure relief port and used for cooperating with the pressure relief port; and a pressure relief spring used for applying pressure to the valve clack, so that the flexible sealing gasket blocks the pressure relief port.

16 Claims, 5 Drawing Sheets

(56) References Cited

U.S. PATENT DOCUMENTS

| | | | | |
|---|---|---|---|---|
| 6,443,184 B1* | 9/2002 | Funderburk | .......... | F16K 15/066 137/529 |
| 2005/0199291 A1* | 9/2005 | Price | .................... | F16K 15/066 137/529 |
| 2013/0199622 A1* | 8/2013 | Tomasko | .............. | F16K 17/406 137/15.01 |

* cited by examiner

INTERNAL PRESSURE RELIEF SAFETY VALVE OF WATER HEATER AND WATER HEATER

CROSS-REFERENCE TO RELATED APPLICATIONS

This non-provisional application is based upon and claims priority under 35 U.S.C. § 119(a) to Chinese Patent Application No. 201721218625.0, filed on Sep. 21, 2017, the entire contents of which are hereby incorporated by reference.

TECHNICAL FIELD

This invention relates to a valve field and, more particularly, to an internal pressure relief safety valve of a water heater and the water heater.

BACKGROUND

The safety valve is in a closed state under an action of external force and is a special valve to prevent pressure in a pipe or equipment from exceeding a specified value by discharging a medium out of a system when medium pressure in the equipment or the pipe rises above the specified value. The safety valve is an automatic valve, and control pressure does not exceed the specified value, which plays an important role in personal safety and an equipment operation.

At present, conventional safety valves on the market adopt open pressure relief methods, such as a safety valve installed in an electric water heater. When the water pressure in a tank of the electric water heater reaches a set value, the safety valve begins to relieve pressure, and water in the tank is discharged through a pressure relief port, thereby reducing the water pressure in the tank. This type of safety valve can effectively protect the tank of the electric water heater, but there are several problems:

1 During a pressure relief process, the water is discharged, and the discharged water cannot be re-entered into a circulation, which causes unnecessary waste;

2 During the pressure relief process, due to pressure-induced changes, the water is directly in contact with the outside world, which causes the valve body itself to vibrate and generate whistle (sharp air flow sound); and 3 When an abnormality occurs in an inner part of the valve body, a path is directly generated between the electric water heater and the pressure relief port, resulting in continuous discharge of water in the pipe, resulting in wastage of water and electricity, and a case of the discharged water destroying the furniture and the decoration.

To solve the above-mentioned problems, Chinese patent publication no. CN206377312U provides a closed safety valve in which the high-pressure water in the valve body can flow back into the low pressure water inflow channel through the pressure relief port without causing extra waste and destruction to furniture, decoration and so on. The closed safety valve is a closed environment, and the water flowing through the valve cannot directly contact with the outside world, so there is no abnormal air flow sound.

The valve clack and the pressure relief port in the above-mentioned patent are hard seals, and the sealing effect is not ideal.

SUMMARY

To solve the above-mentioned problems and overcome the deficiencies, this invention provides an internal pressure relief safety valve of a water heater and the water heater with a good sealing effect.

The technical solution adopted by this invention is as follows:

The internal pressure relief safety valve of the water heater includes:

a valve body, the valve body includes a water inflow channel, a water outflow channel and a pressure relief channel, the water inflow channel communicates with the water outflow channel through a water outflow hole, and one end of the pressure relief channel communicates with both the water inflow channel and the water outflow channel, wherein the pressure relief channel communicates with the water outflow channel through a connection port, and the pressure relief channel communicates with the water inflow channel through a pressure relief port;

a unidirectional water inflow assembly, disposed in the valve body and configured to allow water flow to flow from the water inflow channel to the water outflow channel unidirectionally;

a valve clack cooperates with a side wall of the pressure relief channel in a sliding and sealing way;

a flexible sealing gasket, installed at one end of the valve clack facing toward the pressure relief port and used for cooperating with the pressure relief port; and a pressure relief spring is used for applying pressure to the valve clack, so that the flexible sealing gasket blocks the pressure relief port.

By disposing the flexible sealing gasket at one end of the valve clack facing toward the pressure relief port, a seal of the pressure relief port is changed from a hard seal to a soft seal, and a sealing effect is better.

Cooperation between the valve clack and the pressure relief channel in the sliding and sealing way described in this application refers that the valve clack and the pressure relief channel are not only cooperated in a sliding way but also cooperated in a sealing way. In practical applications, at least one sealing ring can be installed at an outer side wall of the valve clack.

The unidirectional water inflow assembly can be the unidirectional water inflow assembly of an existing internal pressure relief safety valve of the water heater.

When the closed internal pressure relief safety valve of the water heater in the present application is working, the liquid in the water outflow channel flows into the pressure release channel. When a water pressure in the pressure relief channel exceeds a set value, the liquid pushes the valve clack to move against the pressure of the pressure relief spring such that the flexible sealing gasket no longer blocks the pressure relief port, the water in the pressure relief channel flows through the connection port and the pressure relief port in turn and then flows into the water inflow channel (low pressure end), and the pressure in the water outflow channel and the pressure relief channel is reduced, so as to achieve overpressure protection; when the water pressure in the pressure relief channel is reduced, the valve clack is under the action of the elastic force of the pressure relief spring, and the flexible sealing gasket blocks the pressure relief port again to prevent the liquid from flowing from the pressure relief port into the water inflow channel.

The closed internal pressure relief safety valve of the water heater in this application ensures the safety of an inner tank of the electric water heater, and the high pressure water in the valve body can flow back into the low pressure water inflow channel through the pressure relief port without additional waste and destruction to furniture, decoration and so on; and the closed internal pressure relief safety valve of the water heater is a closed environment, and the water flowing through the valve cannot directly contact with the outside world, so there is no abnormal air flow sound (whistle).

The flexible sealing gasket in this application can use a plurality of existing materials for sealing. Preferably, the material of the flexible sealing gasket may be rubber.

Optionally, the valve clack may include a first working position and a second working position; the flexible sealing gasket may abut against the pressure relief port to seal the pressure relief port in the first working position; and in the second working position, the valve clack may be pressed against the pressure of the pressure relief spring and may move away from the pressure relief port so that the flexible sealing gasket may be separated from the pressure relief port; and a side of the pressure relief channel adjacent to the pressure relief port may have a limiting step, one end of the valve clack facing toward the pressure relief port may cooperate with the limiting step, and the valve clack and the limiting step may abut against each other when it is in the first working position.

The function of the limiting step is to ensure that when the valve clack is moved to the position (first working position) under an action of the pressure relief spring, compression degree of the flexible sealing gasket contacting the pressure relief port of the valve body is controllable, avoiding damage to the flexible sealing gasket caused by excessive compression degree so as to ensure stable pressure relief of a product.

Optionally, one end of the valve clack facing toward the pressure relief port may have an installation slot, and the flexible sealing gasket may be installed in the installation slot.

Optionally, a division plate may be provided between the water inflow channel and the water outflow channel, and the water outflow hole may be disposed at the division plate. The valve body may include a tube body, and the division plate may be disposed in the tube body to divide the internal space of the tube body into two parts: the water inflow channel and the water outflow channel. The valve body may further include a pressure relief tube disposed at a side wall of the tube body, and the internal space of the pressure relief tube may be the pressure relief channel.

In this application, the division plate can either be a separate part, or be integrally formed with the tube body and the pressure relief tube.

Optionally, a valve cap connected with the pressure relief tube may be further included, and the pressure relief spring may be disposed in the valve cap.

Optionally, the valve cap may have a threaded hole, and a pressure regulating head screwing with the threaded hole may be disposed in the valve cap. One end of the pressure relief spring may cooperate with the pressure regulating head, and the other end may cooperate with the valve clack.

One end of the pressure regulating head away from the pressure relief spring has a tightening slot, and a fastening tole can reach into the valve cap and cooperate with the tightening slot so as to regulate the position of the pressure regulating head in the threaded hole. Compression degree of the pressure relief spring can be adjusted by adjusting the position of the pressure regulating head.

Optionally, the unidirectional water inflow assembly may be disposed in the water outflow channel, and the unidirectional water inflow assembly may include:

a unidirectional shaft, one end of the unidirectional shaft may have a disc-shaped part, and a unidirectional sealing gasket may be installed at one side of the disc-shaped part facing toward the water outflow hole;

a water inflow spring, sleeved at the unidirectional shaft, may be used for applying force on the disc-shaped part such that the unidirectional sealing gasket may seal the water outflow hole; and a limiting ring may be fixed in the water outflow channel, one end of the water inflow spring may abut against the disc-shaped part, and the other end may abut against the limiting ring.

Optionally, the limiting ring may screw with the water outflow channel; and one end of the unidirectional shaft may have an umbrella-shaped anti-dropping part, the unidirectional sealing gasket may be sleeved at the unidirectional shaft through the umbrella-shaped anti-dropping part, and the unidirectional sealing gasket may abut against the disc-shaped part.

This application further provides a water heater including the internal pressure relief safety valve of the water heater described above.

Beneficial effects of this invention is: by disposing the flexible sealing gasket at one end of the valve clack facing toward the pressure relief port, a seal of the pressure relief port is changed from a hard seal to a soft seal, and a sealing effect is better.

Figure 1:
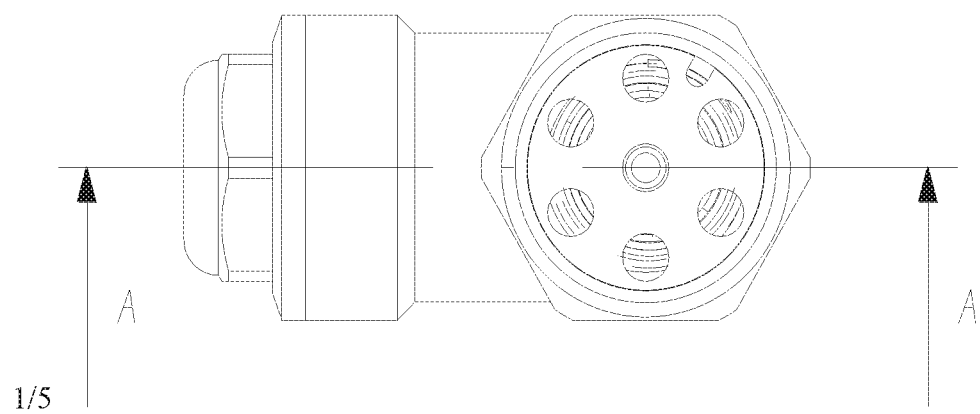
FIG. 1 is a top view of an internal pressure relief safety valve of a water heater in this invention.

FIGURE REFERENCE NUMBERS 1 valve body; 2 pressure regulating head; 3 valve cap; 4 pressure relief spring; 5 valve clack; 6 flexible sealing gasket; 7 tube body; 8 pressure relief tube; 9 water inflow channel; 10 water outflow channel; 11 pressure relief channel; 12 division plate; 13 water outflow hole; 14 connection port; 15 pressure relief port; 16 limiting step; 17 installation slot; 20 threaded hole; 21 unidirectional shaft; 22 disc-shaped part; 23 unidirectional sealing gasket; 24 umbrella-shaped anti-dropping part; 25 water inflow spring; and 26 limiting ring.

DETAILED DESCRIPTION

This invention will be described in detail below with reference to the accompanying drawings.

As shown in FIG. 1 to FIG. 5, an internal pressure relief safety valve of a water heater includes:

a valve body 1, the valve body 1 includes a water inflow channel 9, a water outflow channel 10 and a pressure relief channel 1, the water inflow channel 9 communicates with the water outflow channel 10 through a water outflow hole 13, and one end of the pressure relief channel 11 communicates with both the water inflow channel 9 and the water outflow channel 10, wherein the pressure relief channel 11 communicates with the water outflow channel 10 through a connection port 14, and the pressure relief channel 11 communicates with the water inflow channel 9 through a pressure relief port 15;

a unidirectional water inflow assembly, disposed in the valve body 1, is used for allowing water flow to flow from the water inflow channel 9 to the water outflow channel 10 unidirectionally;

a valve clack 5 cooperates with a side wall of the pressure relief channel 11 in a sliding and sealing way;

a flexible sealing gasket 6, installed at one end of the valve clack 5 facing toward the pressure relief port 15, is used for cooperating with the pressure relief port 15; and a pressure relief spring 4 is used for applying pressure to the valve clack 5, so that the flexible sealing gasket 6 blocks the pressure relief port 15.

By disposing the flexible sealing gasket 6 at one end of the valve clack 5 facing toward the pressure relief port 15, a seal of the pressure relief port 15 is changed from a hard seal to a soft seal, and a sealing effect is better.

Cooperation between the valve clack 5 and the pressure relief channel 11 in the sliding and sealing way described in this application refers that the valve clack 5 and the pressure relief channel 11 are not only cooperated in a sliding way but also cooperated in a sealing way. In practical applications, at least one sealing ring can be installed at an outer side wall of the valve clack 5.

The unidirectional water inflow assembly can be the unidirectional water inflow assembly of an existing internal pressure relief safety valve of the water heater.

When the closed internal pressure relief safety valve of the water heater in the present application is working, the liquid in the water outflow channel 10 flows into the pressure release channel 11. When a water pressure in the pressure relief channel 11 exceeds a set value, the liquid pushes the valve clack 5 to move against the pressure of the pressure relief spring 4 such that the flexible sealing gasket 6 no longer blocks the pressure relief port 15, the water in the pressure relief channel 11 flows through the connection port 14 and the pressure relief port in turn and then flows into the water inflow channel 9 (low pressure end), and the pressure in the water outflow channel 10 and the pressure relief channel 11 is reduced, so as to achieve overpressure protection; when the water pressure in the pressure relief channel 11 is reduced, the valve clack 5 is under the action of the elastic force of the pressure relief spring 4, and the flexible sealing gasket 6 blocks the pressure relief port 15 again to prevent the liquid from flowing from the pressure relief port into the water inflow channel 9.

The closed internal pressure relief safety valve of the water heater in this application ensures the safety of an inner tank of the electric water heater, and the high pressure water in the valve body 1 can flow back into the low pressure water inflow channel 9 through the pressure relief port 15 without additional waste and destruction to furniture, decoration and so on; and the closed internal pressure relief safety valve of the water heater is a closed environment, and the water flowing through the valve cannot directly contact with the outside world, so there is no abnormal air flow sound (whistle).

The flexible sealing gasket 6 in this application can use a plurality of existing materials for sealing. Preferably, the material of the flexible sealing gasket 6 is rubber.

In this embodiment, the valve clack 5 includes a first working position and a second working position; the flexible sealing gasket 6 abuts against the pressure relief port 15 to seal the pressure relief port 15 in the first working position (see FIG. 2); and in the second working position, the valve clack 5 is pressed against the pressure of the pressure relief spring 4 and moves away from the pressure relief port 15 so that the flexible sealing gasket 6 is separated from the pressure relief port 15; and a side of the pressure relief channel 11 adjacent to the pressure relief port 15 has a limiting step 16, one end of the valve clack 5 facing toward the pressure relief port 15 cooperates with the limiting step 16, and the valve clack 5 and the limiting step 16 abuts against each other when it is in the first working position.

The function of the limiting step 16 is to ensure that when the valve clack 5 is moved to the position (first working position) under an action of the pressure relief spring 4, compression degree of the flexible sealing gasket 6 contacting the pressure relief port 15 of the valve body 1 is controllable, avoiding damage to the flexible sealing gasket caused by excessive compression degree so as to ensure stable pressure relief of a product.

Figure 2:
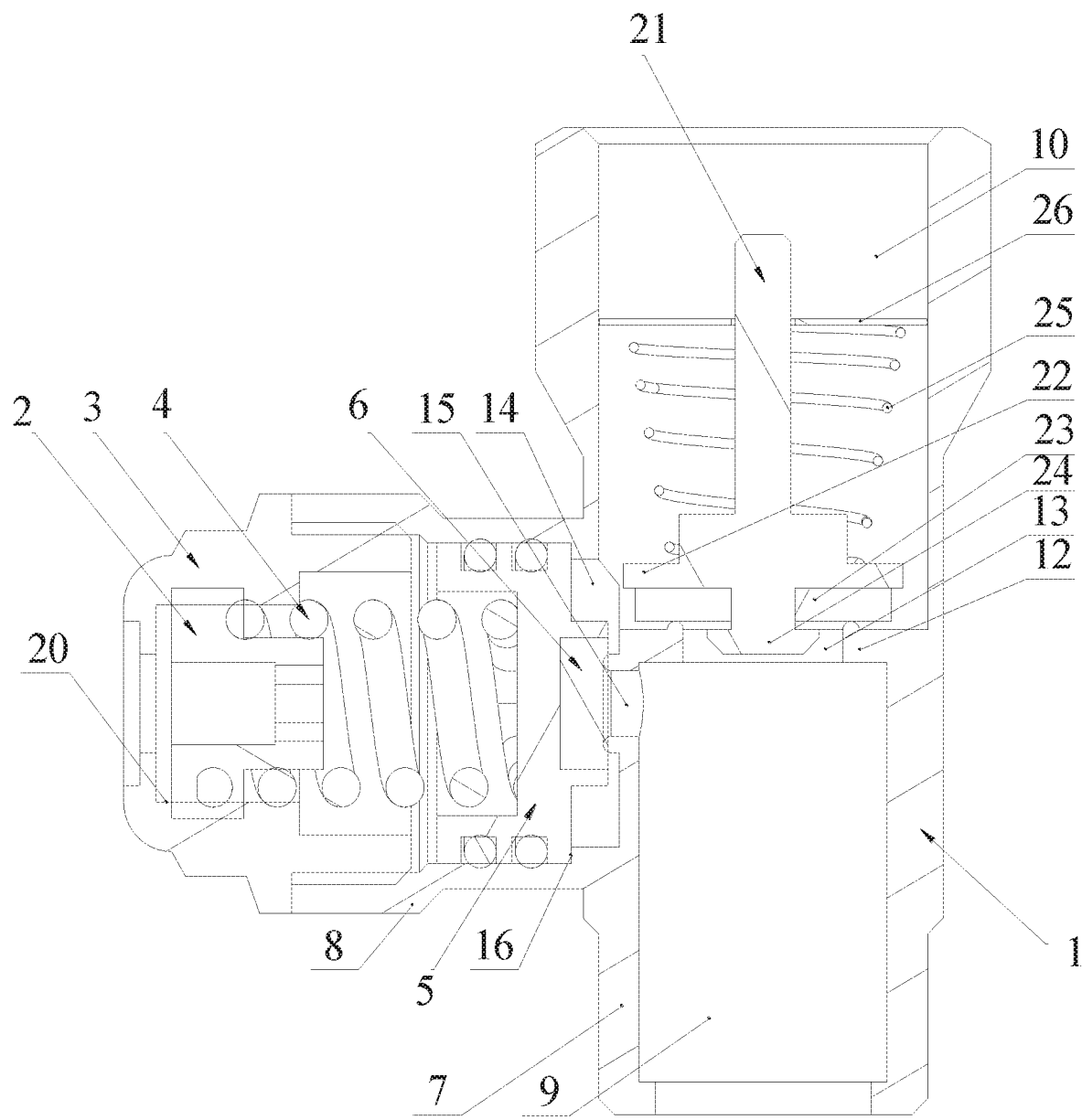
FIG. 2 is an A-A sectional view of FIG. 1.
Figure 3:
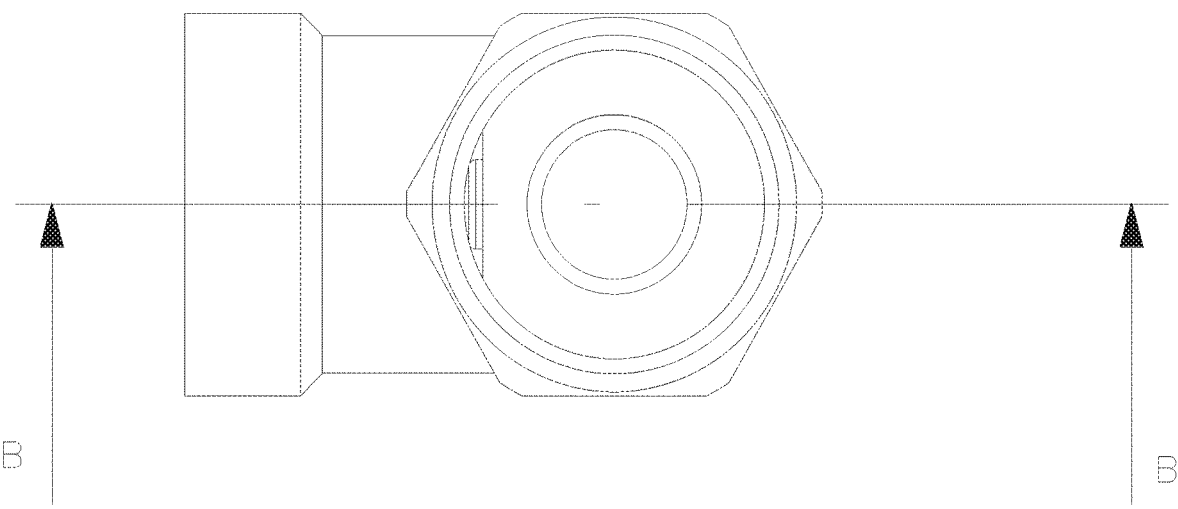
FIG. 3 is a top view of a valve body.
Figure 5:
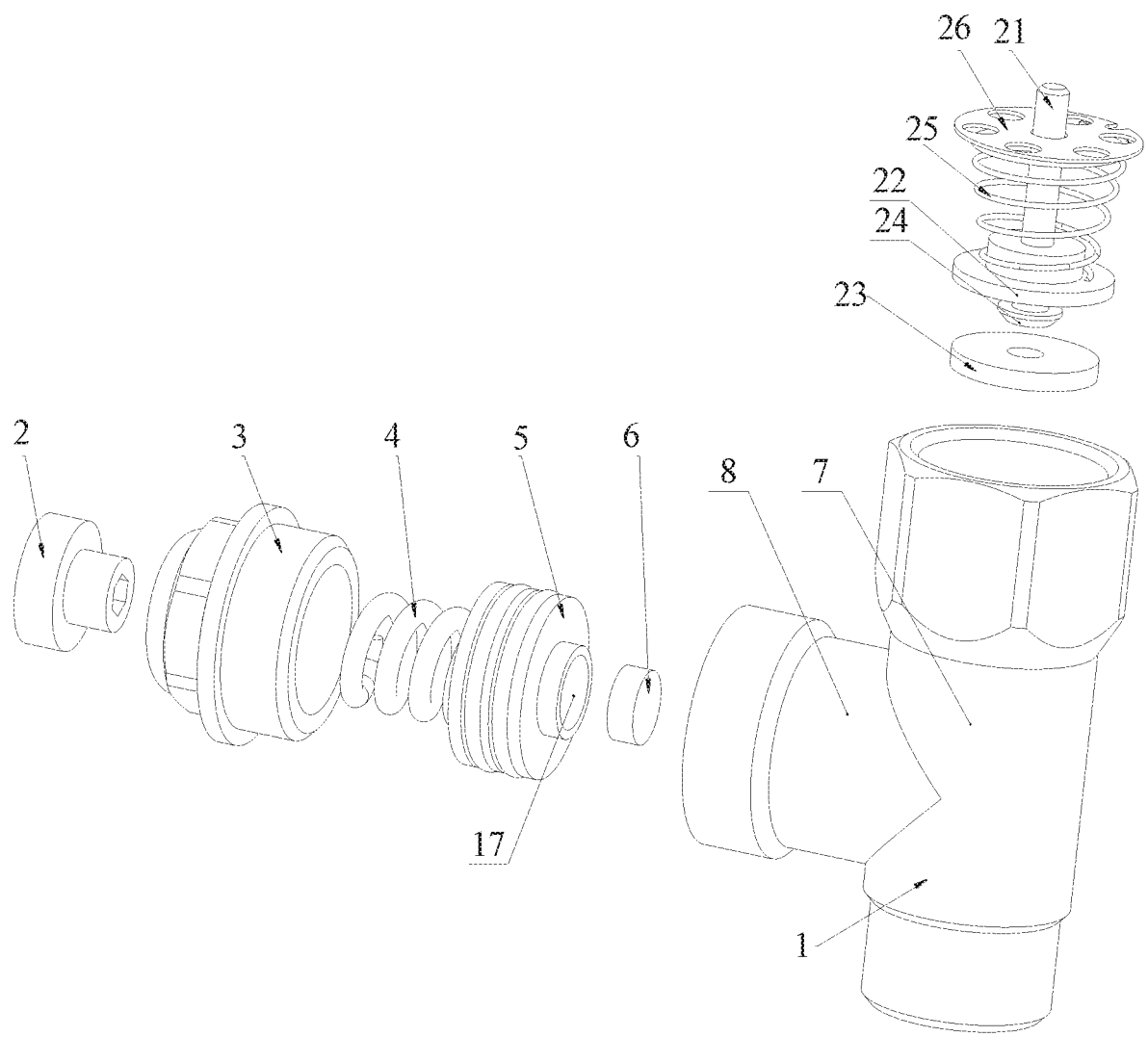
FIG. 5 is an exploded view of the internal pressure relief safety valve of the water heater in this invention.

As shown in FIG. 2 and FIG. 5, in this embodiment, one end of the valve clack 5 facing toward the pressure relief port 15 has an installation slot 17, and the flexible sealing gasket 6 is installed in the installation slot 17.

Figure 4:
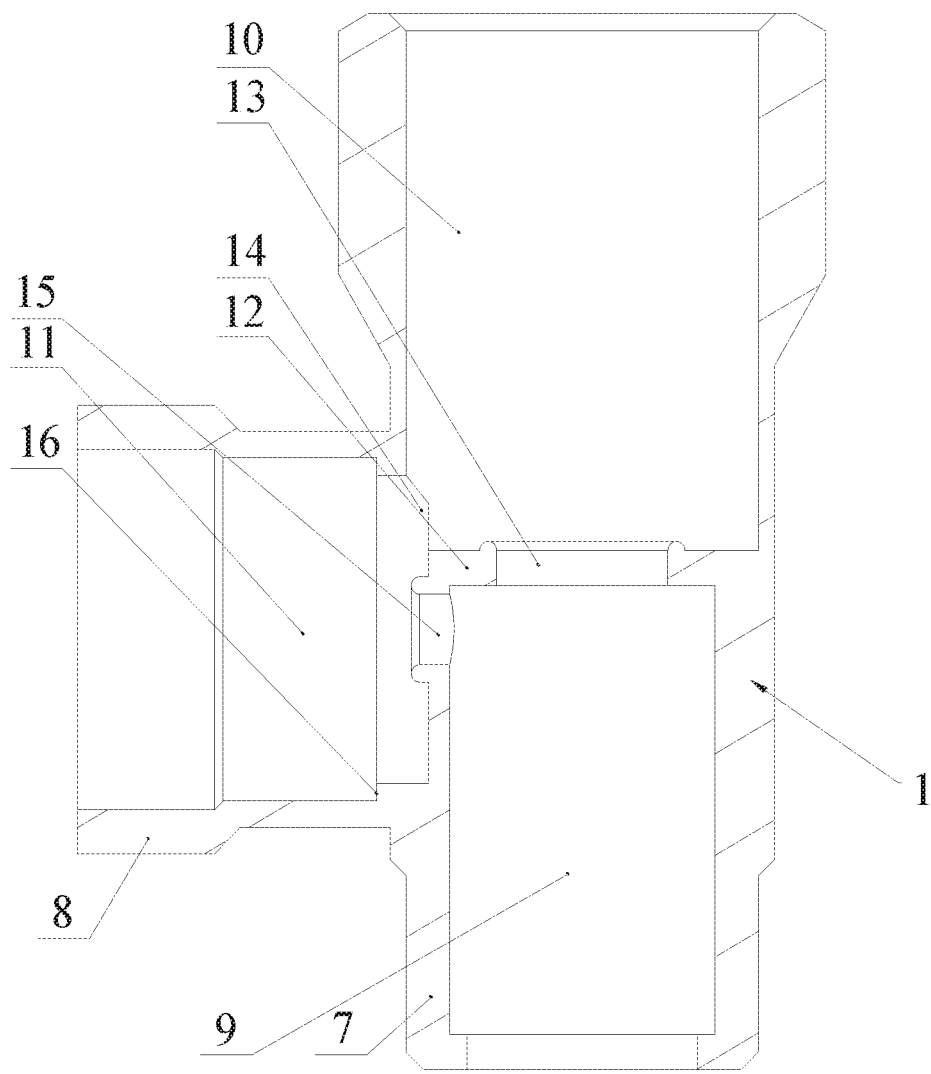
FIG. 4 is a B-B sectional view of FIG. 3.

As shown in FIG. 2 and FIG. 4, in this embodiment, a division plate 12 is provided between the water inflow channel 9 and the water outflow channel 10, and the water outflow hole 13 is disposed at the division plate 12. The valve body 1 includes a tube body 7, and the division plate 12 is disposed in the tube body 7 to divide the internal space of the tube body 7 into two parts: the water inflow channel 9 and the water outflow channel 10. The valve body 1 further includes a pressure relief tube 8 disposed at a side wall of the tube body 7, and the internal space of the pressure relief tube 8 is the pressure relief channel 11.

In this embodiment, the division plate 12 can be integrally formed with the tube body 7 and the pressure relief tube 8.

As shown in FIG. 2 and FIG. 5, in this embodiment, a valve cap 3 connected with the pressure relief tube 8 is further included, and the pressure relief spring 4 is disposed in the valve cap 3.

As shown in FIG. 2 and FIG. 5, in this embodiment, the valve cap 3 has a threaded hole 20, and a pressure regulating head 2 screwing with the threaded hole 20 is disposed in the valve cap 3. One end of the pressure relief spring 4 cooperates with the pressure regulating head 2, and the other end cooperates with the valve clack 5.

One end of the pressure regulating head 2 away from the pressure relief spring 4 has a tightening slot, and a fastening tole can reach into the valve cap 3 and cooperate with the tightening slot so as to regulate the position of the pressure regulating head 2 in the threaded hole 20. Compression degree of the pressure relief spring 4 can be adjusted by adjusting the position of the pressure regulating head 2.

As shown in FIG. 2 and FIG. 5, in this embodiment, the unidirectional water inflow assembly is disposed in the water outflow channel 10, and the unidirectional water inflow assembly includes:

a unidirectional shaft 21, one end of the unidirectional shaft 21 has a disc-shaped part 22, and a unidirectional sealing gasket 23 is installed at one side of the disc-shaped part 22 facing toward the water outflow hole 13;

a water inflow spring 25, sleeved at the unidirectional shaft 21, is used for applying force on the disc-shaped part 22 such that the unidirectional sealing gasket 23 seals the water outflow hole 13; and a limiting ring 26 is fixed in the water outflow channel 10, one end of the water inflow spring 25 abuts against the disc-shaped part 22, and the other end abuts against the limiting ring 26.

As shown in FIG. 2 and FIG. 5, in this embodiment, the limiting ring 26 screws with the water outflow channel 10; and one end of the unidirectional shaft 21 has an umbrella-shaped anti-dropping part 24, the unidirectional sealing gasket 23 is sleeved at the unidirectional shaft 21 through the umbrella-shaped anti-dropping part 24, and the unidirectional sealing gasket 23 abuts against the disc-shaped part 22.

This embodiment further provides a water heater, and the internal pressure relief safety valve of the water heater in this embodiment is installed at this water heater.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An internal pressure relief safety valve of a water heater, comprising:
    a valve body, a unidirectional water inflow assembly, a valve clack, a flexible sealing gasket, and a pressure relief spring;
    wherein the valve body comprises a water inflow channel, a water outflow channel and a pressure relief channel, the water inflow channel communicates with the water outflow channel through a water outflow hole, and a first end of the pressure relief channel communicates with the water inflow channel and the water outflow channel, the first end of the pressure relief channel communicates with the water outflow channel through a connection port, and the first end of the pressure relief channel communicates with the water inflow channel through a pressure relief port;
    wherein the valve clack is configured to work in a first working position and a second working position; the flexible sealing gasket abuts against the pressure relief port to seal the pressure relief port in the first working position; and in the second working position, the valve clack is pressed against a pressure of the pressure relief spring and moves away from the pressure relief port so that the flexible sealing gasket is separated from the pressure relief port;
    wherein a side of the pressure relief channel is provided with a limiting step, the side of the pressure relief channel is adjacent to the pressure relief port, the first end of the valve clack cooperates with the limiting step, and in the first working position, the valve clack and the limiting step abuts against each other;
    the unidirectional water inflow assembly comprises a unidirectional shaft concentrically disposed in the valve body in axial alignment with the water inflow and outflow channels and configured to allow a water flow to flow from the water inflow channel to the water outflow channel unidirectionally, an end of the shaft has a disc-shaped portion, a terminal umbrella-shaped portion and a unidirectional sealing gasket therebetween;
    the valve clack cooperates with a side wall of the pressure relief channel in a sliding and sealing way;
    the flexible sealing gasket is installed at a first end of the valve clack, the first end of the valve clack faces toward the pressure relief port, and the flexible sealing gasket is configured to cooperate with the pressure relief port; and
    the pressure relief spring is configured to apply a pressure to the valve clack, so that the flexible sealing gasket blocks the pressure relief port.

2. The internal pressure relief safety valve according to claim 1, wherein the flexible sealing gasket is made of a rubber.

3. The internal pressure relief safety valve according to claim 1, wherein the first end of the valve clack comprises an installation slot, and the flexible sealing gasket is installed in the installation slot.

4. The internal pressure relief safety valve according to claim 1, wherein a division plate is provided between the water inflow channel and the water outflow channel, the water outflow hole is disposed at the division plate, the valve body comprises a tube body, the division plate is disposed in the tube body to divide an internal space of the tube body into two parts, the two parts are respectively the water inflow channel and the water outflow channel, the valve body further comprises a pressure relief tube, the pressure relief tube is disposed at a side wall of the tube body, and an internal space of the pressure relief tube is the pressure relief channel.

5. The internal pressure relief safety valve according to claim 4, further comprising a valve cap, the valve cap is connected with the pressure relief tube, and the pressure relief spring is disposed in the valve cap.

6. The internal pressure relief safety valve according to claim 5, wherein the valve cap comprises a threaded hole, a pressure regulating head screwing with the threaded hole is disposed in the valve cap, a first end of the pressure relief spring cooperates with the pressure regulating head, and a second end of the pressure relief spring cooperates with the valve clack.

7. The internal pressure relief safety valve according to claim 1, wherein the unidirectional water inflow assembly further comprises
    a water inflow spring and a limiting ring;
    the water inflow spring is sleeved on the unidirectional shaft for applying a force on the disc-shaped portion of the shaft such that the unidirectional sealing gasket seals the water outflow hole; and
    the limiting ring is fixed in the water outflow channel, wherein a first end of the water inflow spring abuts against the disc-shaped portion of the shaft, and a second end of the water inflow spring abuts against the limiting ring.

8. The internal pressure relief safety valve according to claim 7, wherein the limiting ring is threadedly secured in the water outflow channel; the unidirectional sealing gasket is sleeved on the unidirectional shaft through the umbrella-shaped terminal end portion, and the unidirectional sealing gasket abuts against the disc-shaped portion of the unidirectional shaft.

9. A water heater, comprising an internal pressure relief safety valve, wherein the internal pressure relief safety valve comprises a valve body, a unidirectional water inflow assembly, a valve clack, a flexible sealing gasket, and a pressure relief spring;
    wherein the valve body comprises a water inflow channel, a water outflow channel and a pressure relief channel, the water inflow channel communicates with the water outflow channel through a water outflow hole, and a first end of the pressure relief channel communicates with the water inflow channel and the water outflow channel, the first end of the pressure relief channel communicates with the water outflow channel through a connection port, and the first end of the pressure relief channel communicates with the water inflow channel through a pressure relief port;

wherein the valve clack is configured to work in a first working position and a second working position; the flexible sealing gasket abuts against the pressure relief port to seal the pressure relief port in the first working position; and in the second working position, the valve clack is pressed against a pressure of the pressure relief spring and moves away from the pressure relief port so that the flexible sealing gasket is separated from the pressure relief port;

wherein a side of the pressure relief channel is provided with a limiting step, the side of the pressure relief channel is adjacent to the pressure relief port, the first end of the valve clack cooperates with the limiting step, and in the first working position, the valve clack and the limiting step abuts against each other;

the unidirectional water inflow assembly comprises a unidirectional shaft concentrically disposed in the valve body in axial alignment with the water inflow and outflow channels and configured to allow a water flow to flow from the water inflow channel to the water outflow channel unidirectionally, an end of the shaft has a disc-shaped portion, a terminal umbrella-shaped portion and a unidirectional sealing gasket therebetween;

the valve clack cooperates with a side wall of the pressure relief channel in a sliding and sealing way;

the flexible sealing gasket is installed at a first end of the valve clack, the first end of the valve clack faces toward the pressure relief port, and the flexible sealing gasket is configured to cooperate with the pressure relief port; and the pressure relief spring is configured to apply a pressure to the valve clack, so that the flexible sealing gasket blocks the pressure relief port.

10. The water heater according to claim 9, wherein the flexible sealing gasket is made of a rubber.

11. The water heater according to claim 9, wherein the first end of the valve clack comprises an installation slot, and the flexible sealing gasket is installed in the installation slot.

12. The water heater according to claim 9, wherein a division plate is provided between the water inflow channel and the water outflow channel, the water outflow hole is disposed at the division plate, the valve body comprises a tube body, the division plate is disposed in the tube body to divide an internal space of the tube body into two parts, the two parts are respectively the water inflow channel and the water outflow channel, the valve body further comprises a pressure relief tube, the pressure relief tube is disposed at a side wall of the tube body, and an internal space of the pressure relief tube is the pressure relief channel.

13. The water heater according to claim 12, further comprising a valve cap, the valve cap is connected with the pressure relief tube, and the pressure relief spring is disposed in the valve cap.

14. The water heater according to claim 13, wherein the valve cap comprises a threaded hole, a pressure regulating head screwing with the threaded hole is disposed in the valve cap, a first end of the pressure relief spring cooperates with the pressure regulating head, and a second end of the pressure relief spring cooperates with the valve clack.

15. The water heater according to claim 9, wherein the unidirectional water inflow assembly further comprises a water inflow spring and a limiting ring, the water inflow spring is sleeved on the unidirectional shaft for applying a force on the disc-shaped portion of the shaft such that the unidirectional sealing gasket seals the water outflow hole; and the limiting ring is fixed in the water outflow channel, wherein a first end of the water inflow spring abuts against the disc-shaped portion of the shaft, and a second end of the water inflow spring abuts against the limiting ring.

16. The water heater according to claim 15, wherein the limiting ring is threadedly secured in the water outflow channel; the unidirectional sealing gasket is sleeved on the unidirectional shaft through the umbrella-shaped terminal end portion, and the unidirectional sealing gasket abuts against the disc-shaped portion of the unidirectional shaft.

\* \* \* \* \*